Feb. 6, 1962　　　D. D. KNAPIC　　　3,020,131
ROTATING PEDESTAL
Filed Oct. 22, 1959
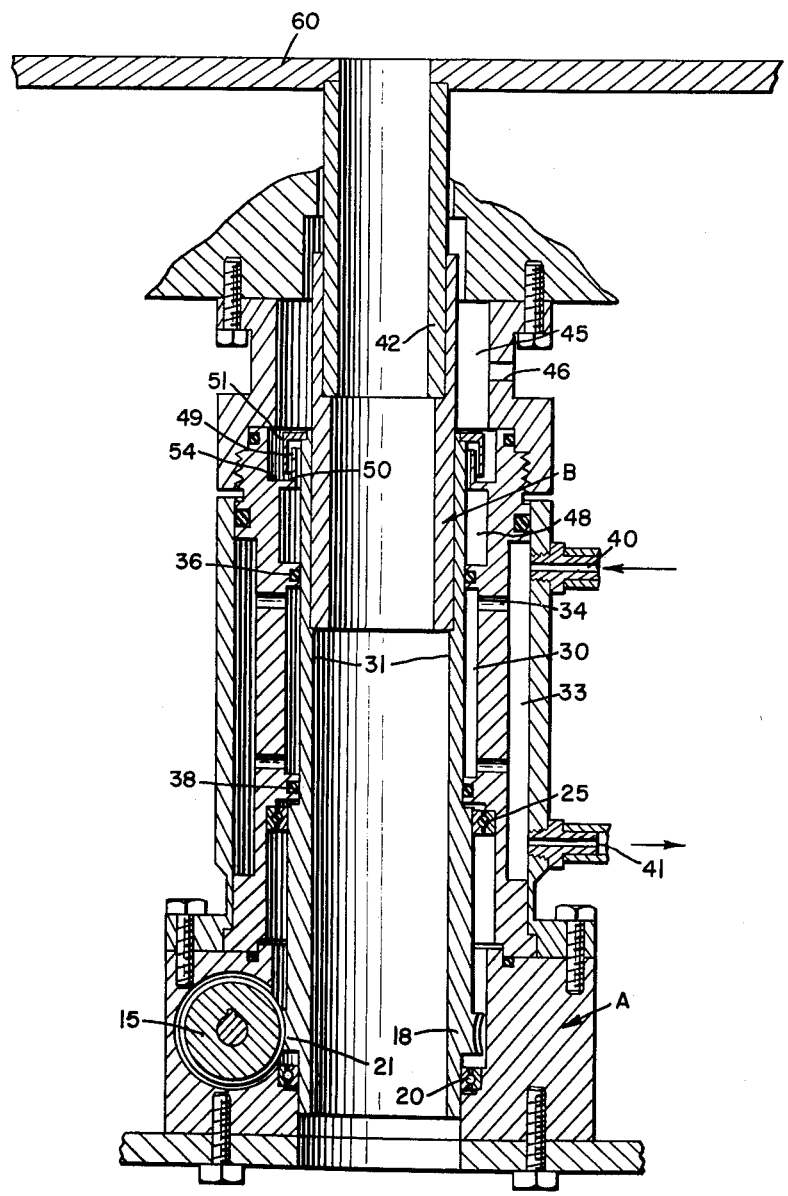
INVENTOR.
Dean D. Knapic
BY 3,020,131
ROTATING PEDESTAL
Dean D. Knapic, Los Altos, Calif., assignor to Knapic Electro-Physics, Inc., Palo Alto, Calif., a corporation of California
Filed Oct. 22, 1959, Ser. No. 848,130
5 Claims. (Cl. 23—273)

This invention relates to a rotating pedestal for supporting a hot crucible.

In growing silicon, germanium and other like crystals from a melt it is desirable in many instances to rotate the crucible during the growing process. It is, however, difficult to rotate the crucible due to the extreme heat that is carried on the pedestal. In addition pedestals often must be formed with a hollow bore so that the light flux may be viewed from a point substantially below the crucible thus giving an accurate measurement of the temperature of the melt. Conventional bearings for guiding and aligning the pedestal are unsuitable in that the heat from the pedestal causes deterioration of the bearings or misalignment thereof.

It is the principal object of this invention to provide a unique bearing configuration together with a combination of cooling means which are adapted to cool the bearings so as to allow for the free and easy rotation of the pedestal in highly aligned guidance.

One of the features of this invention is the provision of a primary gas withdrawing vent on the upper portion of the pedestal which is arranged to withdraw a substantial portion of the hot gas which drifts from the crucible.

Another feature and advantage of this invention is a trap which is located below the gas withdrawal area of the pedestal to trap solid particles and gases which may not be withdrawn from the primary gas chamber.

A further feature and advantage of this invention is the provision of a water cooling jacket between the gas trap area and the bearings so as to effectively isolate the bearings from the heat.

Another object of this invention is to provide heat isolation for the bearings by providing a rotating device in contact with the pedestal disposed between two bearings which give rigid aligned support to the pedestal and by providing a water jacket above the upper bearings to cool the pedestal above the bearings and to provide above the water jacket a gas trap for removing the hot gases while also acting to form a cooling device for the portion of the pedestal above the water jacket.

A still further feature and advantage of this invention is that the pedestal can rotate smoothly and efficiently while maintaining the bearings isolated from deleterious heat.

Other objects of the present invention will become apparent upon reading the following specification and referring to the accompanying drawings in which similar characters of reference represent corresponding parts in each of the several views.

In the drawings:

The FIGURE of the drawing is a cross-sectional view of the invention.

Referring now to the drawings there is provided a pedestal structure having a main housing A carrying at the bottom a worm type gear 15 which is arranged to engage and rotate the base 18 of the hollow collar forming pedestal B.

The pedestal is supported and guided for vertical rotation in housing A by a bearing 20 which is located below the meshing gears 21 on base 18 of pedestal B and a similar bearing 25 is located slightly above gear 21. The two bearings 20 and 25 form the total rotatable support for pedestal B.

Housing A is formed to provide a water jacket 30 which is adapted to surround a portion of the mid-portion 31 of pedestal B in such a way as to effectively cool the mid-portion of the pedestal. The housing is also divided into an outer water jacket 33 with communicating apertures 34 leading between the inner and outer water jackets.

Seals 38 are provided on the upper and lower extremities of the inner water jacket to form a seal against mid-portion 31 of pedestal B. Water is inserted into the outer water jacket from a fitting 40 and removed from a fitting 41 so that a continuous circulatory water system is arranged to carry away the heat in portion 31 of the pedestal.

Pedestal B is adapted for use with hot crucibles and in such crucibles there is a considerable quantity of gas which can drop down to the bearing area. The gas itself is not only harmful in that it contains abrasive contaminants but also carries heat. In order to dissipate the gases a gas chamber is placed adjacent the upper portion 42 of pedestal B to collect gas in the area of the housing.

Housing A is formed to provide an upper annular gas chamber 45 into which a vent 46 is formed through which gas can be withdrawn from chamber 45. The gas may be withdrawn by pumping means or may be merely vented to atmosphere. Normally the gases in addition to having gaseous substances contain solid material which tends to drop out. In order to collect the solid material and provide an area of gaseous isolation above inner water jacket 30 a second gas chamber 48 is provided below gas chamber 45 and separated by a trap 49.

Trap 49 is formed by an upwardly extending collar 50 with a mating spaced depending collar 51 disposed above collar 50, in a relationship which forms a solid matter trapping area 54 on a horizontal plate which forms the base for vertical collar 50. Thus gas must travel from chamber 45 down to trap area 54, thence up between vertical collars 50 and 51 and thence downwardly into chamber 48. The gas that depends into chamber 48 is thus free from solid matter which could conceivably pass between water seal 38 and thus cause wear and abrasive action on the water seal. Gaseous area 48 also acts as an effective insulator.

Thus in operation it can be seen that when gear 15 is rotated the pedestal will in a corresponding manner rotate. A crucible can be inserted on the platform 60 mounted on the uppermost portion of pedestal B and rotated. The entire pedestal B is hollow so that the bottom portion of the crucible can be viewed optically.

It can be seen that the two bearings 20 and 25 and the gear rotating mechanism including gears 15 and 21 are maintained in a cool condition. Inner water jacket 30 surrounds mid-portion 31 of pedestal B to effectively carry away a substantial portion of the heat which is conducted down to that portion of the pedestal. Outer water jacket 33 depends downwardly below bearing 25 so that there is substantial water cooling also of bearing 25 by virtue of the water within outer water jacket 33. The area around pedestal B and above mid-portion 31 is isolated by the lower gas chamber 48 and an upper gas chamber 45 is arranged to allow the hot gases adjacent the pedestal to be removed.

The gas and solid matter trap 49 allows gas to be carried by the lower chamber 48 without undue circulation and with an adequate trap to prevent the deposition of solid material in the chamber.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A pedestal for rotating a hot crucible comprising a hollow vertical column, a housing encasing said vertical column, bearing means on the lower portion of said housing in spaced relation supporting said column for vertical rotation, drive means mounted between said bearing means to rotatably drive said column, a water jacket within said housing mounted above said bearing means, water seal means forming the upper and lower limits of said water jacket against said column, said sealing means located in spaced relation above said bearing means, a gas chamber mounted above said water chamber within said housing, said gas chamber having an upper and lower chamber area, venting means venting said upper chamber means to atmosphere, and gas trap means mounted between said upper and lower chamber areas.

2. A pedestal for rotating a hot crucible comprising a hollow vertical column, a plurality of bearing means mounted on the lower end of said column to support said column for vertical rotation, means connected to the lower end of said column to rotate said pedestal, and a water jacket surrounding said column above said bearing means.

3. A pedestal for rotating a hot crucible comprising a hollow shaft, means to support and rotate said shaft on a vertical axis mounted on the bottom portion of said shaft; a gas trap mounted between said support means and the upper end of said shaft, said gas trap including a housing mounted about said shaft, a depending annular flange mounted on said shaft and within said housing a portion of which extends outwardly from said shaft, and an upwardly extending annular flange mounted on said housing and spaced from said housing and said shaft, a portion of said upwardly extending flange positioned between said downwardly extending flange and said shaft.

4. A device according to claim 3 and wherein said housing is vented to atmosphere between said flanges and the upper portion of said shaft.

5. A device according to claim 3 having a water jacket positioned between said bearing support means and said gas trap housing.

References Cited in the file of this patent
UNITED STATES PATENTS
2,872,299    Celmer _____ Feb. 3, 1959